United States Patent
Kim et al.

(10) Patent No.: US 10,524,169 B2
(45) Date of Patent: Dec. 31, 2019

(54) METHOD AND APPARATUS FOR PERFORMING CELL RESELECTION PROCEDURE BY A UE

(71) Applicant: LG ELECTRONICS INC., Seoul (KR)

(72) Inventors: Sangwon Kim, Seoul (KR); Youngdae Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 205 days.

(21) Appl. No.: 15/598,187

(22) Filed: May 17, 2017

(65) Prior Publication Data
US 2017/0339606 A1 Nov. 23, 2017

Related U.S. Application Data

(60) Provisional application No. 62/337,877, filed on May 18, 2016, provisional application No. 62/354,102, (Continued)

(51) Int. Cl.
| | |
|---|---|
| H04W 36/00 | (2009.01) |
| H04W 36/22 | (2009.01) |
| H04W 36/38 | (2009.01) |
| H04W 48/20 | (2009.01) |
| H04W 28/08 | (2009.01) |
| H04W 88/06 | (2009.01) |

(52) U.S. Cl.
CPC ... *H04W 36/0061* (2013.01); *H04W 36/0007* (2018.08); *H04W 36/0083* (2013.01); *H04W 36/22* (2013.01); *H04W 36/38* (2013.01); *H04W 48/20* (2013.01); *H04W 28/085* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 10,111,202 B2* | 10/2018 | Kim | | H04W 4/06 |
| 2012/0258750 A1* | 10/2012 | Kim | | H04W 48/20 |
| | | | | 455/509 |

(Continued)

OTHER PUBLICATIONS

3rd Generation Partnership Project (3GPP), "Technical Specification Group Radio Access Network; Evolved Universal Terrestrial Radio Access (E-UTRA); User Equipment (UE) procedures in idle mode (Release 11)," Section 5.2 of 3GPP TS 36.304 V11.5.0, Sep. 2013, 15 pages.

(Continued)

*Primary Examiner* — Xavier Szewai Wong
(74) *Attorney, Agent, or Firm* — Lee Hong Degerman Kang & Waimey

(57) ABSTRACT

Provided are a method for performing cell reselection procedure in a wireless communication system and an apparatus supporting the same. A user equipment (UE) receives an information of a multicast-broadcast single-frequency network (MBSFN)-dedicated frequency; adjusts priority information on candidate frequencies such that the MBSFN-dedicated frequency has a lowest priority among the candidate frequencies on which the UE is allowed to camp; and performs cell reselection based on the adjusted priority information.

9 Claims, 15 Drawing Sheets

Related U.S. Application Data filed on Jun. 23, 2016, provisional application No. 62/401,940, filed on Sep. 30, 2016.

(56) References Cited

U.S. PATENT DOCUMENTS

| | | | | |
|---|---|---|---|---|
| 2012/0322447 | A1* | 12/2012 | Ramachandran | H04W 48/18 455/436 |
| 2013/0336173 | A1* | 12/2013 | Mandil | H04W 36/0072 370/280 |
| 2014/0036868 | A1* | 2/2014 | Guo | H04W 36/165 370/331 |
| 2015/0334611 | A1* | 11/2015 | Kim | H04W 36/0083 370/331 |
| 2015/0381378 | A1* | 12/2015 | Zhang | H04W 72/005 370/312 |
| 2016/0255670 | A1* | 9/2016 | Lee | H04W 76/14 370/329 |
| 2017/0171787 | A1* | 6/2017 | Fu | H04W 36/0072 |
| 2017/0280362 | A1* | 9/2017 | Persson | H04W 24/10 |
| 2018/0035342 | A1* | 2/2018 | Fujishiro | H04W 16/32 |

OTHER PUBLICATIONS

3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," Section 15 of 3GPP TS 36.300 V11.7.0, Sep. 2013, 22 pages.

\* cited by examiner

MBMS GW: MBMS Gateway
MCE: Multi-Cell /Multicast Coordination Entity

M1: user plane inter face
M2: E-UTRAN internal control plane interface
M3: control plane interface between E-UTRAN and EPC

METHOD AND APPARATUS FOR PERFORMING CELL RESELECTION PROCEDURE BY A UE

CROSS-REFERENCE TO RELATED APPLICATIONS

Pursuant to 35 U.S.C. § 119(e), this application claims the benefit of U.S. Provisional Patent Application Nos. 62/337,877, filed on May 18, 2016, 62/354,102, filed on Jun. 23, 2016, and 62/401,940, filed on Sep. 30, 2016, the contents of which are all hereby incorporated by reference herein in their entirety.

BACKGROUND OF THE INVENTION

Field of the Invention

The present invention relates to a technology for a user equipment (UE), which receives a multimedia broadcast multicast service (MBMS) service, to perform cell reselection to a new cell.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. The 3GPP LTE adopts MIMO (multiple input multiple output) having maximum four antennas. In recent years, there is an ongoing discussion on 3GPP LTE-advanced (LTE-A) that is an evolution of the 3GPP LTE.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The 3GPP LTE can provide a multimedia broadcast multicast service (MBMS) service. The MBMS is a service which simultaneously transmits data packets to multiple users. If a specific level of users exists in the same cell, the respective users can be allowed to share necessary resources so that the plurality of users can receive the same multimedia data, thereby increasing resource efficiency. In addition, a multimedia service can be used with a low cost from the perspective of users.

A UE may receive an MBMS service through a multicast-broadcast single-frequency network (MBSFN)-dedicated frequency. In this case, since the MBSFN-dedicated frequency allows only downlink transmission, the UE needs to be RRC-connected to a cell supporting uplink transmission in order to perform uplink transmission. Accordingly, there is a need for a technology for the UE to perform cell reselection to an appropriate cell while receiving the MBMS service through the MBSFN-dedicated frequency.

SUMMARY OF THE INVENTION

Since a user equipment (UE) is not allowed to perform uplink transmission in a multicast-broadcast single-frequency network (MBSFN)-dedicated cell, the UE needs to be connected to a new cell if uplink transmission is necessary (for example, a paging message is received), and the new cell needs to support uplink transmission. Accordingly, an algorithm is required for the UE to reselect an appropriate cell while receiving a multimedia broadcast multicast service (MBMS) service.

The 3GPP defines FeMBMS in Release. 14. An MBMS frequency according to FeMBMS is defined to additionally include subframes 4 or 9 among subframes 0-9 of a radio frame. Thus, a UE configured to support only existing MBMS may not support FeMBMS. That is, a UE not supporting FeMBMS may not normally receive an MBMS service if not excluding a frequency used only for FeMBMS when selecting an MBMS interest frequency, in which case the UE may not maintain the continuity of the MBMS service. Thus, it is required to develop a technology for a UE supporting only conventional MBMS to maintain the continuity of an MBMS service.

According to one embodiment, there is provided a method for performing cell reselection procedure by a UE in a wireless communication system, the method including: receiving an information of a MBSFN-dedicated frequency; adjusting priority information on candidate frequencies such that the MBSFN-dedicated frequency has a lowest priority among the candidate frequencies on which the UE is allowed to camp; and performing cell reselection based on the adjusted priority information.

The method may further include receiving a paging message from an upper layer before the adjusting of the priority information.

The adjusting of the priority information may adjust the priority information such that a frequency including a band allocated for downlink and uplink transmissions among the candidate frequencies has a highest priority.

The method may further include establishing an RRC connection to a reselected cell after the performing of the cell reselection.

The method may further include readjusting the priority information such that the MBSFN-dedicated frequency has a highest priority when the UE enters an RRC idle state, after the performing of the cell reselection.

According to another embodiment, there is provided a method for receiving MBMS service by a UE in a wireless communication system, the method including: receiving an MBMS service from a cell by camping on the cell providing the MBMS service; receiving configuration information on a candidate cell supporting unicast transmission from a network; and establishing an RRC connection to the candidate cell using the configuration information.

The cell providing the MBMS service may be an MBSFN-dedicated cell in which all used subframes are allocated for MBSFN transmission.

The method may further include reselecting any one of the candidate cell included in the configuration information after the receiving of the configuration information on the candidate cell, wherein the establishing of the RRC connection may establish an RRC connection to the reselected cell.

The method may further include acquiring information for establishing the RRC connection to the candidate cell directly from the candidate cell and establishing the RRC connection to the candidate cell using the directly acquired information when the UE does not establish the RRC connection using the configuration information.

The configuration information may be transmitted through system information.

The configuration information may include one or more of a cell identity (ID) of the candidate cell, a downlink frequency for the candidate cell, an uplink frequency for the candidate cell, and system information on the candidate cell.

According to still another embodiment, there is provided a UE performing cell reselection procedure in a wireless communication system, the UE including: a memory; a transceiver; and a processor configured to connect the memory and the transceiver, wherein the processor is configured to: receive an information of a multicast-broadcast single-frequency network (MBSFN)-dedicated frequency; adjust priority information on candidate frequencies such that the MBSFN-dedicated frequency has a lowest priority among the candidate frequencies on which the UE is allowed to camp; and perform cell reselection based on the adjusted priority information.

According to the embodiments of the present invention, a UE may perform uplink transmission by performing an RRC connection to a cell other than an MBSFN-dedicated cell while receiving an MBMS service through an MBSFN-dedicated frequency.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/en-hanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
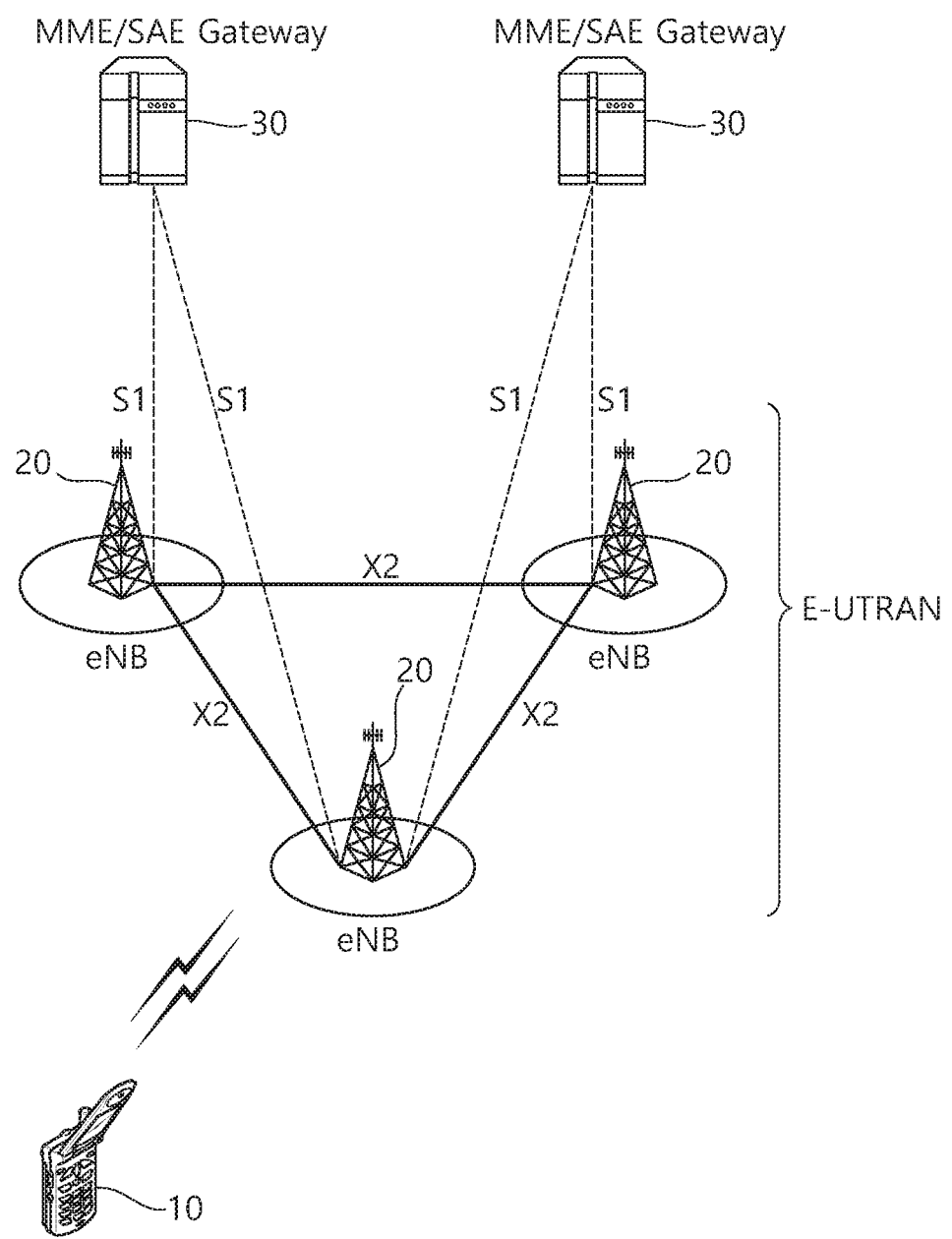
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
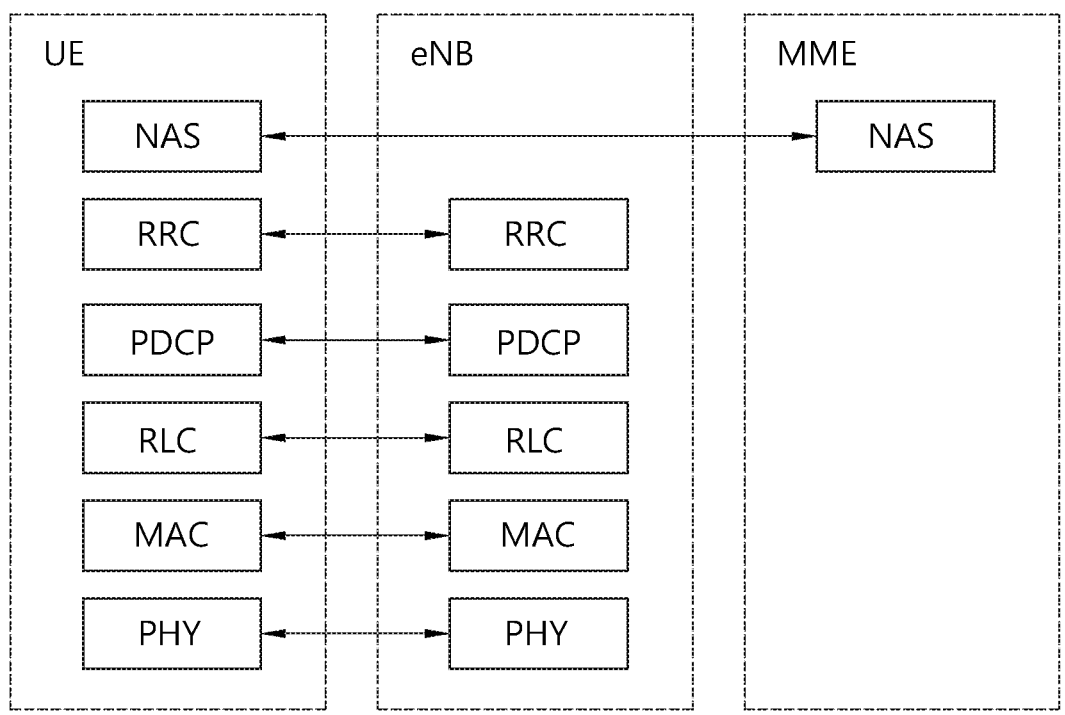
FIG. 2 shows a block diagram of a a control plane protocol stack of an LTE system.
Figure 3:
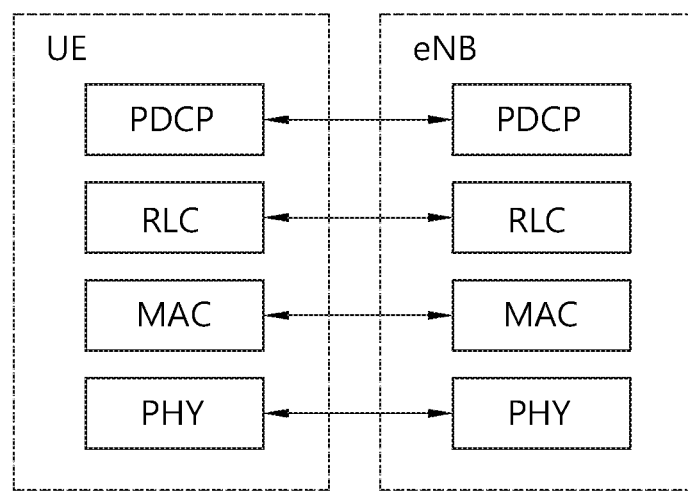
FIG. 3 shows a block diagram of a user plane protocol stack of an LTE system.

FIG. 2 shows a block diagram of a control plane protocol stack of an LTE system, and FIG. 3 shows a block diagram of a user plane protocol stack of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Referring to FIG. 2, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform functions such as scheduling, automatic repeat request (ARQ), and hybrid automatic repeat request (HARQ). The PDCP layer (terminated in the eNB on the network side) may perform the user plane functions such as header compression, integrity protection, and ciphering.

Hereinafter, an RRC state and an RRC connection method of a UE are described.

An RRC state indicates whether an RRC layer of the UE is logically connected to an RRC layer of the E-UTRAN. The RRC state may be divided into two different states such as an RRC_connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC-_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successful, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE announces the location of the UE to the network through a tracking area update procedure.

Figure 4:
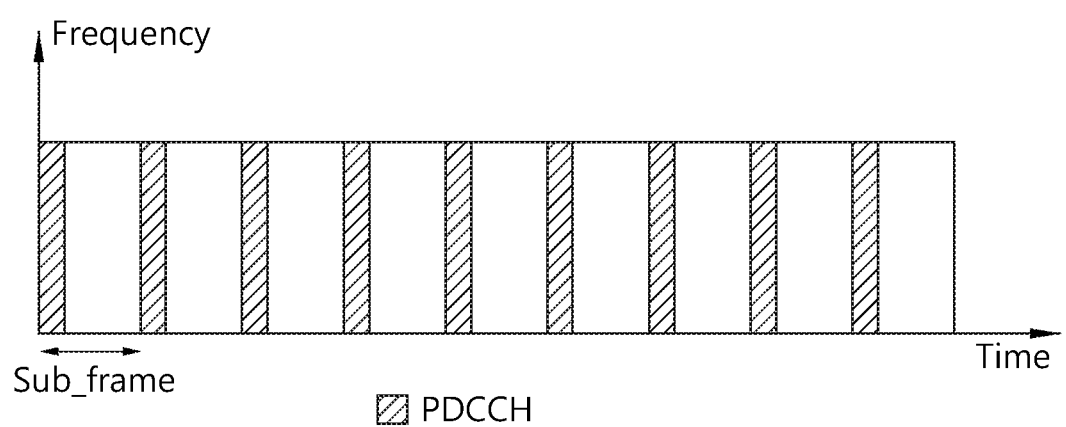
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Multimedia broadcast multicast services (MBMS) are described. It may be referred to Section 15 of 3GPP TS 36.300 V11.7.0 (2013-09).

Figure 5:
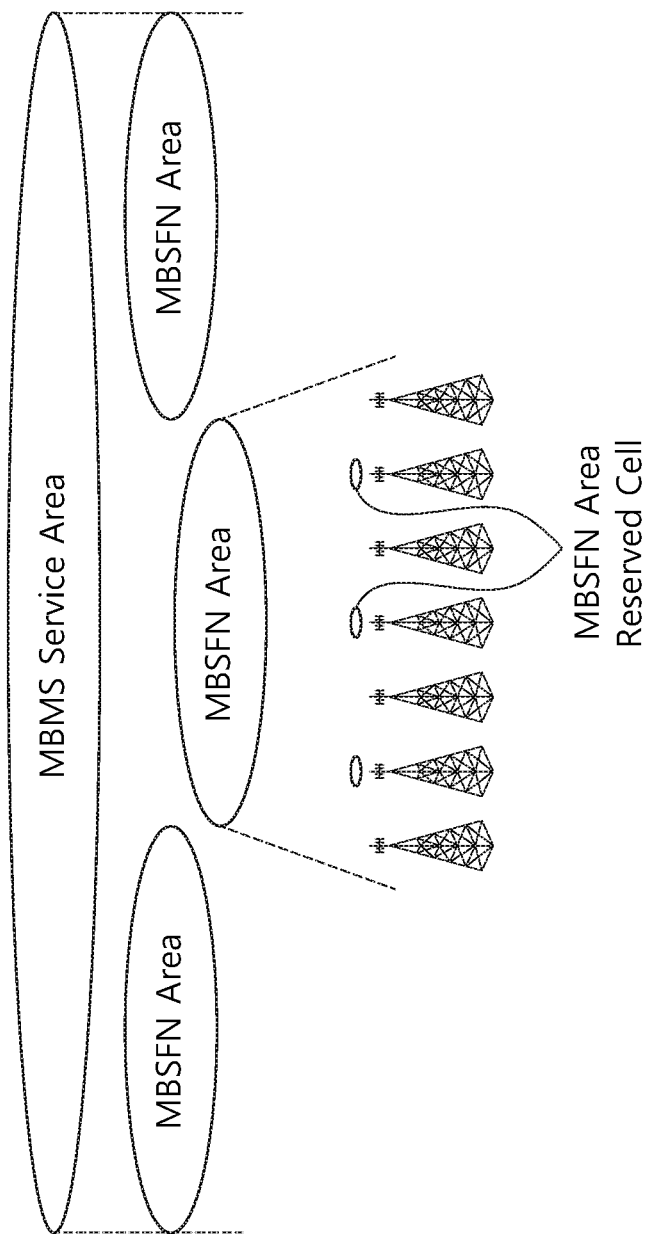
FIG. 5 shows MBMS definitions.

FIG. 5 shows MBMS definitions. For MBMS, the following definitions may be introduced.

Multicast-broadcast single-frequency network (MBSFN) synchronization area: This is an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas.

MBSFN area: an MBSFN area consists of a group of cells within an MBSFN synchronization area of a network, which are coordinated to achieve an MBSFN transmission. Except for the MBSFN area reserved cells, all cells within an MBSFN area contribute to the MBSFN transmission and advertise its availability. The UE may only need to consider a subset of the MBSFN areas that are configured, i.e., when it knows which MBSFN area applies for the service(s) it is interested to receive.

MBSFN area reserved cell: This is a cell within a MBSFN area which does not contribute to the MBSFN transmission. The cell may be allowed to transmit for other services but at restricted power on the resource allocated for the MBSFN transmission.

Synchronization sequence: Each synchronization protocol data unit (SYNC PDU) contains a time stamp which indicates the start time of the synchronization sequence. For an MBMS service, each synchronization sequence has the same duration which is configured in the broadcast and multicast service center (BM-SC) and the multi-cell/multicast coordination entity (MCE).

Synchronization period: The synchronization period provides the time reference for the indication of the start time of each synchronization sequence. The time stamp which is provided in each SYNC PDU is a relative value which refers to the start time of the synchronization period. The duration of the synchronization period is configurable.

Meanwhile, SIB13 includes information required to acquire MBMS control information related to one or more MB SFN areas. Table 1 illustrates elements included in SIB13.

TABLE 1

```
-- ASN1START
SystemInformationBlockType13-r9 ::=    SEQUENCE {
    mbsfn-AreaInfoList-r9                  MBSFN-AreaInfoList-r9,
    notificationConfig-r9                  MBMS-NotificationConfig-r9,
    lateNonCriticalExtension               OCTET STRING           OPTIONAL,
    ...
}
-- ASN1STOP
```

In Table 1, notificationConfig indicates an MBMS notification related to a configuration parameter. When dl-Bandwidth included in MasterInformationBlock is set to n6, the UE may disregard this field.

Further, SIB15 includes the MBMS service area identity (SAI) of a current and/or neighboring carrier frequency. Table 2 illustrates elements included in SIB15.

TABLE 2

```
-- ASN1START
SystemInformationBlockType15-r11 ::=   SEQUENCE {
    mbms-SAI-IntraFreq-r11                 MBMS-SAI-List-r11              OPTIONAL,   -- Need OR
    mbms-SAI-InterFreqList-r11             MBMS-SAI-InterFreqList-r11     OPTIONAL,   -- Need OR
    lateNonCriticalExtension               OCTET STRING                   OPTIONAL,
    ...,
    [[ mbms-SAI-InterFreqList-v1140        MBMS-SAI-InterFreqList-v1140   OPTIONAL    -- Cond
InterFreq
    ]]
}
MBMS-SAI-List-r11 ::=                  SEQUENCE (SIZE (1..maxSAI-MBMS-r11)) OF MBMS-SAI-r11
MBMS-SAI-r11 ::=                       INTEGER (0..65535)
MBMS-SAI-InterFreqList-r11 ::=         SEQUENCE (SIZE (1..maxFreq)) OF MBMS-SAI-InterFreq-r11
MBMS-SAI-InterFreqList-v1140 ::=       SEQUENCE (SIZE (1..maxFreq)) OF MBMS-SAI-InterFreq-v1140
MBMS-SAI-InterFreq-r11 ::=             SEQUENCE {
    dl-CarrierFreq-r11                     ARFCN-ValueEUTRA-r9,
    mbms-SAI-List-r11                      MBMS-SAI-List-r11
}
MBMS-SAI-InterFreq-v1140 ::=   SEQUENCE {
        multiBandInfoList-r11              MultiBandInfoList-r11    OPTIONAL    --
Need OR
}
-- ASN1STOP
```

In Table 2, the sai-IntraFreq field includes a list of the MBMS SAI of a carrier frequency to which a UE is currently connected. The sai-InterFreqList field includes a list of neighboring frequencies providing an MBMS service and a list of MBMS SAIs corresponding thereto. The sai-List field includes a list of MBMS SAIs for a specified frequency.

Meanwhile, an MBMS service may be provided to a UE through a radio frame. The radio frame may be a frequency division duplexing (FDD) frame and may include ten subframes. Regarding a radio frame structure, one radio frame (for example, a radio frame has a length of 10 ms) includes total ten subframes (for example, each subframe has a length of 1 ms), and uses for some subframes are specified. In particular, uses for 0th, 4th, 5th, and 9th subframes are specified, which are described below.

First of all, the 0th and 5th subframes (i.e., subframe 0 and subframe 5 shown in FIG. 1) are configured to carry primary synchronization channel (PSCH) and secondary synchronization channel (SSCH) for a synchronization signal, respectively. The 0th subframe is configured to carry a physical broadcast channel (PBCH) as well as the synchronization signal. Therefore, the 0th subframe in a system is configured to carry the SSCH, PSCH and PBCH and the 5th subframe is configured to carry the SSCH and PSCH. A 4th subframe (represented as subframe 4 in FIG. 1) is configured to carry SIB (system information block) information. And, a 9th subframe (represented as subframe 9 in FIG. 1) is defined as a special subframe for unicast. Thus, according to the conventional technology, an MBMS subframe includes 1st, 2nd, 3rd, 6th, 7th, and 8th subframes excluding 0th, 4th, 5th, and 0th subframes.

In general the control information relevant only for UEs supporting MBMS is separated as much as possible from unicast control information. Most of the MBMS control information is provided on a logical channel specific for MBMS common control information: the MCCH. E-UTRA employs one MCCH logical channel per MBSFN area. In case the network configures multiple MBSFN areas, the UE acquires the MBMS control information from the MCCHs that are configured to identify if services it is interested to receive are ongoing. The action applicable when the UE is unable to simultaneously receive MBMS and unicast services is up to UE implementation. In this release of the specification, an MBMS capable UE is only required to support reception of a single MBMS service at a time, and reception of more than one MBMS service (also possibly on more than one MBSFN area) in parallel is left for UE implementation. The MCCH carries the MBSFNAreaConfiguration message, which indicates the MBMS sessions that are ongoing as well as the (corresponding) radio resource configuration. The MCCH may also carry the MBMSCountingRequest message, when E-UTRAN wishes to count the number of UEs in RRC_CONNECTED that are receiving or interested to receive one or more specific MBMS services.

A limited amount of MBMS control information is provided on the BCCH. This primarily concerns the information needed to acquire the MCCH(s). This information is carried by means of a single MBMS specific SystemInformationBlock: SystemInformationBlockType13. An MBSFN area is identified solely by the mbsfn-AreaId in SystemInformationBlockType13. At mobility, the UE considers that the MBSFN area is continuous when the source cell and the target cell broadcast the same value in the mbsfn-AreaId.

The MCCH information is transmitted periodically, using a configurable repetition period. Scheduling information is not provided for MCCH i.e. both the time domain scheduling as well as the lower layer configuration are semi-statically configured, as defined within SystemInformationBlockType13.

For MBMS user data, which is carried by the MTCH logical channel, E-UTRAN periodically provides MCH scheduling information (MSI) at lower layers (MAC). This MCH information only concerns the time domain scheduling i.e. the frequency domain scheduling and the lower layer configuration are semi-statically configured. The periodicity of the MSI is configurable and defined by the MCH scheduling period.

Change of MCCH information only occurs at specific radio frames, i.e. the concept of a modification period is used. Within a modification period, the same MCCH information may be transmitted a number of times, as defined by its scheduling (which is based on a repetition period). The modification period boundaries are defined by SFN values for which SFN mod m=0, where m is the number of radio frames comprising the modification period. The modification period is configured by means of SystemInformationBlockType13.

Figure 6:
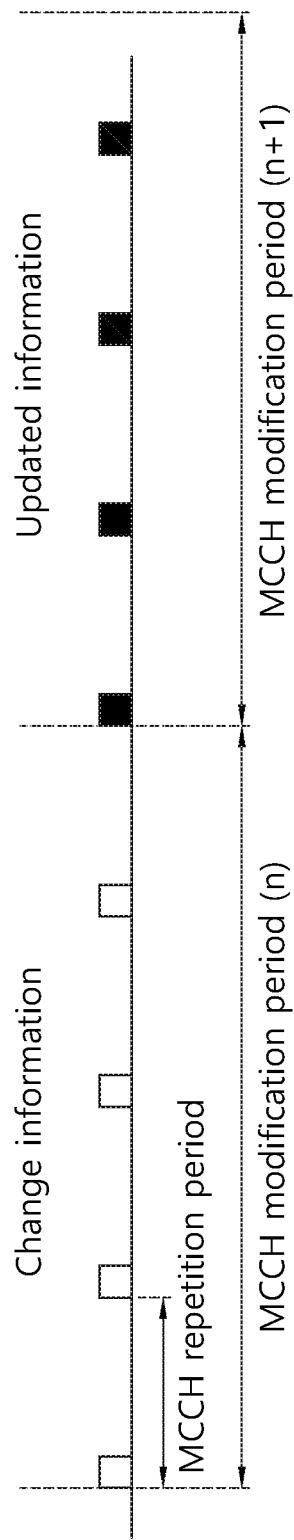
FIG. 6 illustrates a change of MCCH information.

FIG. 6 illustrates a change of MCCH information.

When the network changes (some of) the MCCH information, it notifies the UEs about the change during a first modification period. In the next modification period, the network transmits the updated MCCH information. These general principles are illustrated in FIG. 5.8.1.3-1, in which different colours indicate different MCCH information. Upon receiving a change notification, a UE interested to receive MBMS services acquires the new MCCH information immediately from the start of the next modification period. The UE applies the previously acquired MCCH information until the UE acquires the new MCCH information.

Indication of an MBMS specific RNTI, the M-RNTI (see TS 36.321 [6]), on PDCCH is used to inform UEs in RRC_IDLE and UEs in RRC_CONNECTED about an MCCH information change. When receiving an MCCH information change notification, the UE knows that the MCCH information will change at the next modification period boundary. The notification on PDCCH indicates which of the MCCHs will change, which is done by means of an 8-bit bitmap. Within this bitmap, the bit at the position indicated by the field notificationIndicator is used to indicate changes for that MBSFN area: if the bit is set to "1", the corresponding MCCH will change. No further details are provided e.g. regarding which MCCH information will change. The MCCH information change notification is used to inform the UE about a change of MCCH information upon session start or about the start of MBMS counting.

The MCCH information change notifications on PDCCH are transmitted periodically and are carried on MBSFN subframes only. These MCCH information change notification occasions are common for all MCCHs that are configured, and configurable by parameters included in SystemInformationBlockType13: a repetition coefficient, a radio frame offset and a subframe index. These common notification occasions are based on the MCCH with the shortest modification period.

E-UTRAN may modify the MBMS configuration information provided on MCCH at the same time as updating the MBMS configuration information carried on BCCH i.e. at a coinciding BCCH and MCCH modification period. Upon detecting that a new MCCH is configured on BCCH, a UE interested to receive one or more MBMS services should acquire the MCCH, unless it knows that the services it is interested in are not provided by the corresponding MBSFN area.

A UE that is receiving an MBMS service shall acquire the MCCH information from the start of each modification period. A UE that is not receiving an MBMS service, as well as UEs that are receiving an MBMS service but potentially interested to receive other services not started yet in another MBSFN area, shall verify that the stored MCCH information remains valid by attempting to find the MCCH information change notification at least notificationRepetitionCoeff times during the modification period of the applicable MCCH(s), if no MCCH information change notification is received.

In case the UE is aware which MCCH(s) E-UTRAN uses for the service(s) it is interested to receive, the UE may only need to monitor change notifications for a subset of the MCCHs that are configured, referred to as the 'applicable MCCH(s)' in the above.

Figure 7:
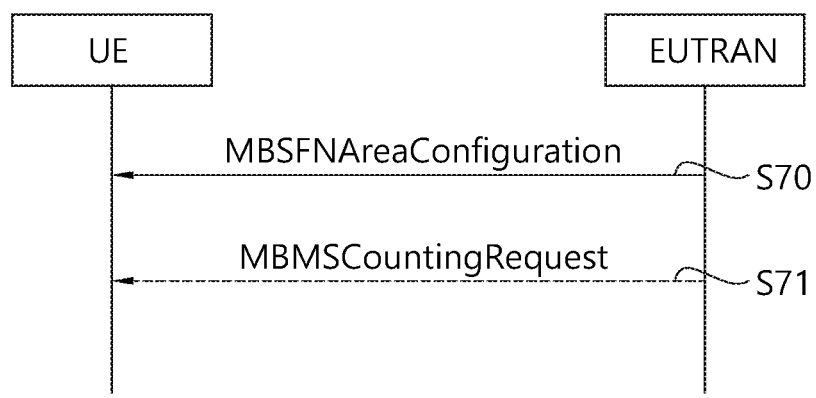
FIG. 7 illustrates a procedure for acquiring MCCH information.

FIG. 7 illustrates a procedure for acquiring MCCH information.

The UE applies the MCCH information acquisition procedure to acquire the MBMS control information that is broadcasted by the E-UTRAN. The procedure applies to MBMS capable UEs that are in RRC_IDLE or in RRC_CONNECTED. A UE interested to receive MBMS services shall apply the MCCH information acquisition procedure upon entering the corresponding MBSFN area (e.g. upon power on, following UE mobility) and upon receiving a notification that the MCCH information has changed. A UE that is receiving an MBMS service shall apply the MCCH information acquisition procedure to acquire the MCCH that corresponds with the service that is being received, at the start of each modification period.

Unless explicitly stated otherwise in the procedural specification, the MCCH information acquisition procedure overwrites any stored MCCH information, i.e. delta configuration is not applicable for MCCH information and the UE discontinues using a field if it is absent in MCCH information unless explicitly specified otherwise.

An MBMS capable UE shall:

1> if the procedure is triggered by an MCCH information change notification:

2> start acquiring the MBSFNAreaConfiguration message and the MBMSCountingRequest message (S70) if present, from the beginning of the modification period following the one in which the change notification was received;

NOTE 1: The UE continues using the previously received MCCH information until the new MCCH information has been acquired.

1> if the UE enters an MBSFN area:

2> acquire the MBSFNAreaConfiguration message (S70) and the MBMSCountingRequest message (S71) if present, at the next repetition period;

1> if the UE is receiving an MBMS service:
2> start acquiring the MBSFNAreaConfiguration message (S70) and the MBMSCountingRequest message (S71) if present, that both concern the MBSFN area of the service that is being received, from the beginning of each modification period;

In the E-UTRAN, MBMS may provide a single-frequency network operating mode (MBSFN) only through a frequency layer shared with non-MBMS services (a set of cells supporting both unicast and MBMS transmissions, that is, a set of "MBMS/unicast-mixed cells").

MBMS reception is possible for UEs in the RRC_CONNECTED or RRC_IDLE state. Whenever receiving MBMS services, a user may be notified of an incoming call, and occurring calls may be possible. Robust header compression (ROHC) is not supported in MBMS.

Figure 8:
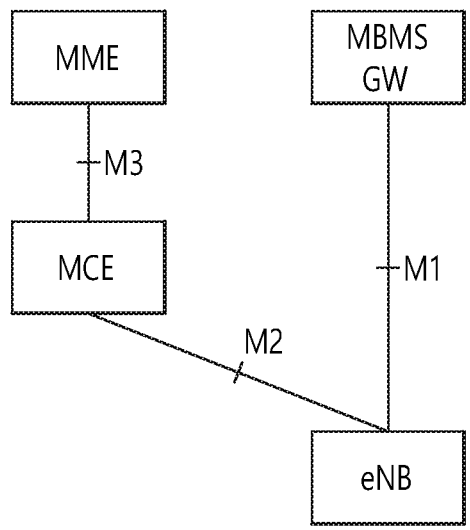
FIG. 8 shows an enhanced MBSM (E-MBMS) logical architecture.

FIG. 8 shows an enhanced MBSM (E-MBMS) logical architecture. 3GPP LTE may support the MBMS, and 3GPP LTE-A may support the E-MBMS.

Referring to FIG. 8, the MCE is connected with the eNB via M2 interface, and with the MME via M3 interface. The MCE is a logical entity. The MCE may be a part of another network element. The functions of the MCE are as follows.

the admission control and the allocation of the radio resources used by all eNBs in the MBSFN area for multi-cell MBMS transmissions using MBSFN operation. The MCE decides not to establish the radio bearer(s) of the new MBMS service(s) if the radio resources are not sufficient for the corresponding MBMS service(s) or may pre-empt radio resources from other radio bearer(s) of ongoing MBMS service(s) according to allocation and retention priority (ARP). Besides allocation of the time/frequency radio resources this also includes deciding the further details of the radio configuration, e.g., the modulation and coding scheme.

counting and acquisition of counting results for MBMS service(s).

resumption of MBMS session(s) within MBSFN area(s) based on, e.g., the ARP and/or the counting results for the corresponding MBMS service(s).

suspension of MBMS session(s) within MBSFN area(s) based on, e.g., the ARP and/or on the counting results for the corresponding MBMS service(s).

The MCE is involved in MBMS session control signaling. The MCE does not perform UE-MCE signaling. An eNB is served by a single MCE.

The MBMS GW is a logical entity. The MBMS GW may be a part of another network element. The MBMS G is present between the BMSC and eNBs whose principal functions is the sending/broadcasting of MBMS packets to each eNB transmitting the service. The MBMS GW uses IP multicast as the means of forwarding MBMS user data to the eNB. The MBMS GW performs MBMS session control signaling (session start/update/stop) towards the E-UTRAN via the MME.

The M3 interface is a control plane interface which connects between the MCE and MME. An application part is defined for this interface between the MME and MCE. This application part allows for MBMS session control signaling on E-UTRAN radio access bearer (E-RAB) level (i.e., does not convey radio configuration data). The procedures comprise, e.g., MBMS session start and stop. Stream control transmission protocol (SCTP) is used as signaling transport i.e., point-to-point signaling is applied.

The M2 interface is a control plane interface which connects between the MCE and eNB. An application part is defined for this interface, which conveys at least radio configuration data for the multi-cell transmission mode eNBs and session control signaling. SCTP is used as signaling transport, i.e., point-to-point signaling is applied.

The M1 interface is a pure user plane interface which connects the MBMS GW and eNB. Consequently no control plane application part is defined for this interface. IP multicast is used for point-to-multipoint delivery of user packets.

MBMS interest indication is described. It may be referred to Section 5.8.5 of 3GPP TS 36.331 V11.5.0 (2013-09). The purpose of this procedure is to inform the E-UTRAN that the UE is receiving or is interested to receive MBMS via an MBMS radio bearer (MRB), and if so, to inform the E-UTRAN about the priority of MBMS versus unicast reception.

Figure 9:
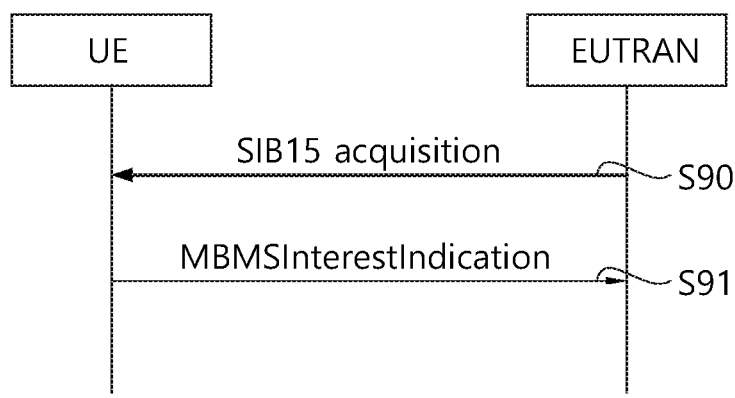
FIG. 9 shows an MBMS interest indication procedure.

FIG. 9 shows an MBMS interest indication procedure. An MBMS capable UE in RRC_CONNECTED may initiate the procedure in several cases including upon successful connection establishment, upon entering or leaving the service area, upon session start or stop, upon change of interest, upon change of priority between MBMS reception and unicast reception or upon change to a primary cell (PCell) broadcasting SystemInformationBlockType15.

Upon initiating the procedure, the UE shall:
1> if SystemInformationBlockType15 is broadcast by the PCell in step S90:
2> ensure having a valid version of SystemInformationBlockType15 for the PCell;
2> if the UE did not transmit an MBMSInterestIndication message since last entering RRC_CONNECTED; or
2> if since the last time the UE transmitted an MBMSInterestIndication message, the UE connected to a PCell not broadcasting SystemInformationBlockType15:
3> if the set of MBMS frequencies of interest is not empty:
4> initiate transmission of the MBMSInterestIndication message;
2> else:
3> if the set of MBMS frequencies of interest has changed since the last transmission of the MBMSInterestIndication message; or
3> if the prioritization of reception of all indicated MBMS frequencies compared to reception of any of the established unicast bearers has changed since the last transmission of the MBMSInterestIndication message:
4> initiate transmission of the MBMSInterestIndication message.

The UE may send an MBMSInterestIndication even when it is able to receive the MBMS services it is interested in i.e. to avoid that the network allocates a configuration inhibiting MBMS reception.

To determine MBMS frequencies of interest, the UE shall:
1> consider a frequency to be part of the MBMS frequencies of interest if the following conditions are met:
2> at least one MBMS session the UE is receiving or interested to receive via an MRB is ongoing or about to start (the UE may determine whether the session is ongoing from the start and stop time indicated in the user service description (USD)); and
2> for at least one of these MBMS sessions SystemInformationBlockType15 acquired from the PCell includes for the concerned frequency one or more MBMS service area identifiers (SAIs) as indicated in the USD for this session (the UE considers a frequency to be part of the MBMS frequencies of interest even though the E-UTRAN may (temporarily) not employ an MRB for the concerned session. i.e., the UE does not verify if the session is indicated on MCCH); and 2> the UE is capable of simultaneously receiving the set of MBMS frequencies of interest, regardless of whether a serving cell is configured on each of these frequencies or not; and 2> the supportedBandCombination the UE included in UE-EUTRA-Capability contains at least one band combination including the set of MBMS frequencies of interest.

Indicating a frequency implies that the UE supports SystemInformationBlockType13 acquisition for the concerned frequency, i.e., the indication should be independent of whether a serving cell is configured on that frequency. When evaluating which frequencies it can receive simultaneously, the UE does not take into account the serving frequencies that are currently configured, i.e., it only considers MBMS frequencies it is interested to receive. The term frequency does not indicate a physical frequency but covers the associated band(s), noting that additional bands may be indicated in SystemInformationBlockType1 (serving frequency) or SystemInformationBlockType15 (neighboring frequencies).

The UE shall set the contents of the MBMSInterestIndication message as follows:

1> if the set of MBMS frequencies of interest is not empty:

2> include mbms-FreqList and set it to include the MBMS frequencies of interest, using the E-UTRA absolute radio frequency channel number (EARFCN) corresponding with freqBandIndicator included in SystemInformationBlockType1, if applicable, and the EARFCN(s) as included in SystemInformationBlockType15. The mbms-FreqList merely indicates the physical frequencies the UE is interested to receive and does not imply the UE supports the associated band.

2> include mbms-Priority if the UE prioritizes reception of all indicated MBMS frequencies above reception of any of the unicast bearers. If the UE prioritizes MBMS reception and unicast data cannot be supported because of congestion on the MBMS carrier(s), the E-UTRAN may initiate release of unicast bearers. It is up to E-UTRAN implementation whether all bearers or only GBR bearers are released. The E-UTRAN does not initiate re-establishment of the released unicast bearers upon alleviation of the congestion.

The UE shall submit the MBMSInterestIndication message to lower layers for transmission. Accordingly, in step S91, the UE transmits the MBMSInterestIndication message to the E-UTRAN.

MBMS counting procedure is described. It may be referred to Section 5.8.4 of 3GPP TS 36.331 V11.5.0 (2013-09). The MBMS counting procedure is used by the E-UTRAN to count the number of RRC_CONNECTED mode UEs which are receiving via an MRB or interested to receive via an MRB the specified MBMS services. The UE determines interest in an MBMS service, which is identified by the temporary mobile group identifier (TMGI), by interaction with upper layers.

Figure 10:
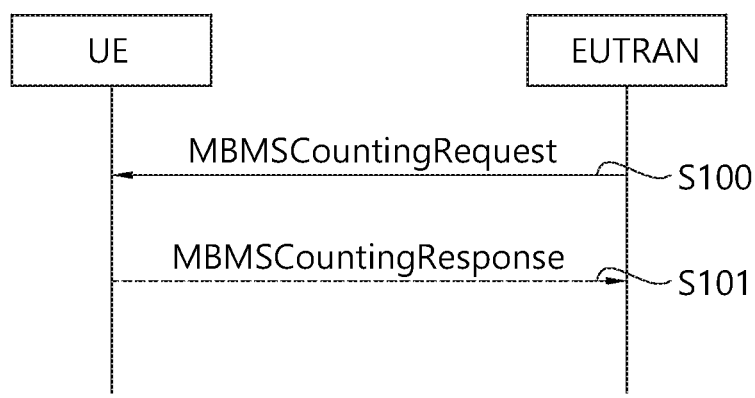
FIG. 10 shows an MBMS counting procedure.

FIG. 10 shows an MBMS counting procedure. In step S100, the E-UTRAN initiates the procedure by sending an MBMSCountingRequest message to the UE. Upon receiving the MBMSCountingRequest message, the UE in RRC_CONNECTED shall:

1> if the SystemInformationBlockType1, that provided the scheduling information for the systemInformationBlockType13 that included the configuration of the MCCH via which the MBMSCountingRequest message was received, contained the identity of the registered PLMN; and 1> if the UE is receiving via an MRB or interested to receive via an MRB at least one of the services in the received countingRequestList:

2> if more than one entry is included in the mbsfn-AreaInfoList received in the SystemInformationBlockType13 that included the configuration of the MCCH via which the MBMSCountingRequest message was received:

3> include the mbsfn-AreaIndex in the MBMSCountingResponse message and set it to the index of the entry in the mbsfn-AreaInfoList within the received SystemInformationBlockType13 that corresponds with the MBSFN area used to transfer the received MBMSCountingRequest message;

2> for each MBMS service included in the received countingRequestList:

3> if the UE is receiving via an MRB or interested to receive via an MRB this MBMS service:

4> include an entry in the countingResponseList within the MBMSCountingResponse message with countingResponseService set it to the index of the entry in the countingRequestList within the received MBMSCountingRequest that corresponds with the MBMS service the UE is receiving or interested to receive;

2> submit the MBMSCountingResponse message to lower layers for transmission upon which the procedure ends;

Accordingly, in step S101, the UE may transmit the MBMSCountingResponse message to the E-UTRAN.

UEs that are receiving an MBMS user service by means of a unicast bearer service (i.e., via a DRB), but are interested to receive the concerned MBMS user service via an MBMS bearer service (i.e., via an MRB), respond to the counting request. If ciphering is used at upper layers, the UE does not respond to the counting request if it cannot decipher the MBMS service for which counting is performed. The UE treats the MBMSCountingRequest messages received in each modification period independently. In the unlikely case the E-UTRAN would repeat an MBMSCountingRequest (i.e., including the same services) in a subsequent modification period, the UE responds again.

Cell reselection is described. It may be referred to Section 5.2 of 3GPP TS 36.304 V11.5.0 (2013-09). When camped on a cell, the UE which remains in RRC_IDLE persistently performs cell reselection to find a better cell according to the cell reselection criteria. In this case, the UE performs measurement and cell reselection by using frequency priority information. That is, the UE may determine which frequency will be preferentially considered when performing frequency measurement and cell reselection on the basis of the frequency priority information. If a better cell is found, that cell is selected. The change of cell may imply a change of RAT.

Absolute priorities of different E-UTRAN frequencies or inter-RAT frequencies may be provided to the UE in the system information, in the RRCConnectionRelease message, or by inheriting from another RAT at inter-RAT cell (re)selection. In the case of system information, an E-UTRAN frequency or inter-RAT frequency may be listed without providing a priority (i.e. the field cellReselectionPriority is absent for that frequency). If priorities are provided in dedicated signalling, the UE shall ignore all the priorities provided in system information. If UE is in camped on any cell state, UE shall only apply the priorities provided by system information from current cell, and the UE preserves priorities provided by dedicated signalling and deprioritisationReq received in RRCConnectionReject unless specified otherwise. When the UE in camped normally state, has only dedicated priorities other than for the current frequency, the UE shall consider the current frequency to be the lowest priority frequency (i.e. lower than any of the network configured values). While the UE is camped on a suitable CSG cell, the UE shall always consider the current frequency to be the highest priority frequency (i.e. higher than any of the network configured values), irrespective of any other priority value allocated to this frequency if that cell can be accessed in normal coverage. If the UE capable of sidelink communication is configured to perform sidelink communication and can only perform the sidelink communication while camping on a frequency, the UE may consider that frequency to be the highest priority.

If the UE is capable either of MBMS Service Continuity or of SC-PTM reception and is receiving or interested to receive an MBMS service and can only receive this MBMS service while camping on a frequency on which it is provided, the UE may consider that frequency to be the highest priority during the MBMS session as long as the two following conditions are fulfilled:

1) Either:
   the UE is capable of MBMS service continuity and the reselected cell is broadcasting SIB13; or
   the UE is capable of SC-PTM reception and the reselected cell is broadcasting SIB20;
2) Either:
   SIB15 of the serving cell indicates for that frequency one or more MBMS SAIs included in the MBMS User Service Description (USD) of this service; or
   SIB15 is not broadcast in the serving cell and that frequency is included in the USD of this service.

If the UE is capable either of MBMS Service Continuity or of SC-PTM reception and is receiving or interested to receive an MBMS service provided on a downlink only MBMS frequency, the UE may consider cell reselection candidate frequencies at which it can not receive the MBMS service to be of the lowest priority during the MBMS session [2], as long as the above mentioned condition 1) is fulfilled for the cell on the MBMS frequency which the UE monitors and as long as the above mentioned condition 2) is fulfilled for the serving cell.

An example scenario in which the previous down-prioritisation may be needed concerns the case the MBMS frequency is a downlink only carrier on which camping is not possible, while the UE can only receive this MBMS frequency when camping on a subset of cell reselection candidate frequencies.

If the UE is not capable of MBMS Service Continuity but has knowledge on which frequency an MBMS service of interest is provided, it may consider that frequency to be the highest priority during the MBMS session as long as the reselected cell is broadcasting SIB13.

If the UE is not capable of MBMS Service Continuity but has knowledge on which downlink only frequency an MBMS service of interest is provided, it may consider cell reselection candidate frequencies at which it can not receive the MBMS service to be of the lowest priority during the MBMS session as long as the cell on the MBMS frequency which the UE monitors is broadcasting SIB13.

The UE considers that the MBMS session is ongoing using the session start and end times as provided by upper layers in the USD i.e. the UE does not verify if the session is indicated on MCCH.

In case UE receives RRCConnectionReject with deprioritisationReq, UE shall consider current carrier frequency and stored frequencies due to the previously received RRCConnectionReject with deprioritisationReq or all the frequencies of EUTRA to be the lowest priority frequency (i.e. lower than any of the network configured values) while T325 is running irrespective of camped RAT. The UE shall delete the stored deprioritisation request(s) when a PLMN selection is performed on request by NAS.

The UE shall delete priorities provided by dedicated signalling when:
   the UE enters RRC_CONNECTED state; or
   the optional validity time of dedicated priorities (T320) expires; or
   a PLMN selection is performed on request by NAS [5].
   NOTE: Equal priorities between RATs are not supported.

The UE shall only perform cell reselection evaluation for E-UTRAN frequencies and inter-RAT frequencies that are given in system information and for which the UE has a priority provided.

The UE shall not consider any black listed cells as candidate for cell reselection.

The UE shall inherit the priorities provided by dedicated signalling and the remaining validity time (i.e., T320 in E-UTRA, T322 in UTRA and T3230 in GERAN), if configured, at inter-RAT cell (re)selection.

FeMBMS is described below. FeMBMS is further enhanced MBMS and is defined to additionally use, for MBMS transmission, 0th and 4th subframes (also represented as subframes 0 and 4) among subframes 0 to 9 of a radio frame. That is, FeMBMS may use subframes 1, 2, 3, 4, 6, 7, 8 and 9 for MBMS transmission. Accordingly, MBMS cell types may be classified into an MBMS-dedicated cell, an MBMS/unicast-mixed cell, and an FeMBMS/unicast-mixed cell.

1) MBMS-dedicated cell: Cells performing only MBMS transmissions are referred to as MBMS-dedicated cells. UEs not supporting FeMBMS are not supported on these cells. Paging is not supported on an MBMS-dedicated cell.

For MBMS-dedicated cells:
   MTCH and MCCH are mapped on MCH for MBSFN transmission;
   MBMS-dedicated cells do not support unicast traffic in the downlink and these cells cannot be used as PCell or PSCell. System information required to receive MBMS from MBMS-dedicated cells is broadcasted on non-MBSFN subframes. The system information change notification as well as ETWS/CMAS notification are provided via L1 signalling on non-MBSFN subframes. The PBCH of MBMS-dedicated cell, uses a different scrambling sequence initialization than the PBCH of MBMS/Unicast-mixed cell which prevents UEs not supporting FeMBMS from camping on this cell.

2) MBMS/unicast-mixed cell: Cells performing both MBMS and unicast transmissions are referred to as MBMS/Unicast-mixed cells.

For MBMS/Unicast-mixed cells:
   MTCH and MCCH are mapped on MCH for MBSFN transmission;
   SC-MTCH and SC-MCCH are mapped on DL-SCH for SC-PTM transmission;
   Transmission of both unicast and MBMS in the cell is done in a co-ordinated manner.

3) FeMBMS/unicast-mixed cell: An FeMBMS/Unicast-mixed cell is an MBMS/Unicast-mixed cell that operates with at least one of the following:
   subframes 4 or 9 or both configured as MBSFN subframes subframes that may not contain unicast control region The FeMBMS/Unicast-mixed cell cannot be used as a PCell or PSCell. To provide unicast traffic on non-MBSFN subframes, such cell needs to be configured as an SCell. UEs not supporting FeMBMS are not supported on these cells and camping of such UEs is prevented by using cell barring mechanism of SIB 1. Paging for incoming calls is not supported on such cells and system information change notification as well as ETWS/CMAS notification are provided with L1 signaling.

Here, when a UE receiving an MBMS service from an MBMS-dedicated cell or FeMBMS/unicast-mixed cell camps on an MBMS cell providing an MBMS service, the UE may not receive a paging function. Thus, when the UE receives a paging message while receiving an MBMS service, the UE needs to avoid camping on a cell providing the MBMS service.

Figure 11:
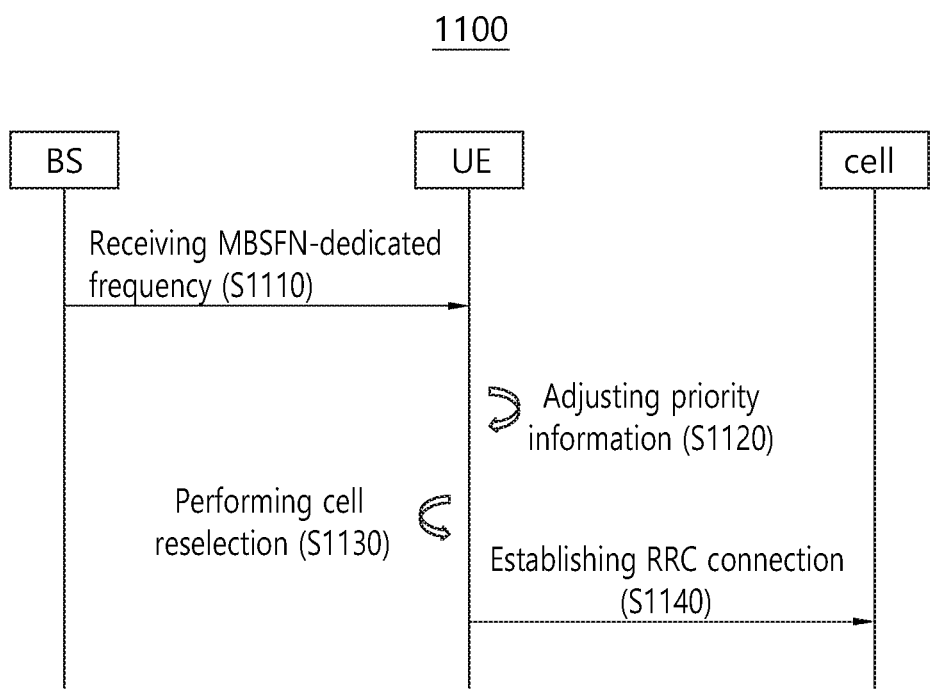
FIG. 11 is a flowchart illustrating a method for a UE to perform cell reselection procedure according to an embodiment of the present invention.

FIG. 11 is a flowchart 1100 illustrating a method for a UE to establish an RRC connection according to an embodiment of the present invention.

The UE may receive an information of MBSFN (multicast broadcast single frequency network)—dedicated frequency from a BS (S1110). The MBSFN-dedicated frequency refers to a frequency that enables only downlink transmission and does not enable uplink transmission. That is, the MBSFN-dedicated frequency may be a downlink-dedicated frequency that is not coupled with an uplink frequency. According to an embodiment of present invention, the UE may receive MBMS service, and the MBMS service is provided to the UE through the MBSFN-dedicated frequency.

When the UE receives a paging message from an upper layer while being provided with the MBMS service, the UE may perform a cell reselection procedure based on priority information on candidate frequencies on which the UE is allowed to camp. Here, the upper layer may be an NAS layer. When the paging message is received, the UE may perform cell reselection procedure with respect to a specified cell for uplink transmission.

When performing cell reselection based on the priority information on the candidate frequencies, the UE may determine which frequency the UE preferentially considers. Here, the candidate frequencies refer to a frequency to be selected by the UE to transmit and receive data. The priority information on the candidate frequencies may be provided by a network to the UE through system information. The candidate frequencies may include not only the MBSFN-dedicated frequency but also a frequency used for unicast transmission. Further, the candidate frequencies may not simply refer to each physical frequency but may be used as a concept covering a related band(s).

The UE may adjust the provided priority information on the candidate frequencies (S1120). Specifically, the UE may adjust the priority information such that the UE does not camp on the MBSFN-dedicated frequency. According to one embodiment, the UE may adjust the priority information such that the MBSFN-dedicated frequency does not have a highest priority. In this case, the MBSFN-dedicated frequency is not a highest-priority frequency any more. Further, the UE may adjust the priority information such that not only the MBSFN-dedicated frequency currently used to receive the MBMS service but also all MBSFN-dedicated frequencies currently not occupied have a lower priority. According to one embodiment, the UE may adjust the priority information such that not only the MBSFN-dedicated frequency currently used but also all MBSFN-dedicated frequencies have a lowest priority. Accordingly, the UE may reduce a possibility of camping on a frequency enabling only downlink transmission. Furthermore, the UE may adjust the priority information such that the MBSFN-dedicated frequency has a lowest priority. Also, the UE may adjust the priority information such that a frequency including a band allocated for downlink (DL) and uplink (UL) transmissions among the candidate frequencies has a highest priority. That is, the UE may adjust the priority information such that a candidate frequency enabling not only downlink transmission but also uplink transmission has a highest priority.

According to another embodiment of the present invention, the UE may be configured to be barred from camping on a cell corresponding to the MBSFN-dedicated frequency. Here, the cell corresponding to the MBSFN-dedicated frequency is a cell supporting only an MBMS service, which may not support unicast transmission and may be referred to as an MBSFN-dedicated cell. All subframes for the MBSFN-dedicated cell may include only MBSFN subframes. That is, the MBSFN-dedicated frequency is a carrier supporting only downlink transmission and may be used by the MBSFN-dedicated cell.

According to one embodiment, the MBSFN-dedicated cell may be an MBMS-dedicated cell defined in Release 14, and an FeMBMS/unicast-mixed cell may also be considered as an MBSFN-dedicated cell depending on an embodiment.

Subsequently, the UE may perform a cell reselection procedure based on the adjusted priority information on the candidate frequencies (S1130). Specifically, the UE may be configured to perform a cell reselection procedure with respect to a cell corresponding to a candidate frequency with a highest priority among the candidate frequencies. According to one embodiment, a reselected cell may be a cell supporting unicast transmission. Further, a reselected cell may be a cell supporting a paging function. To this end, the UE may reselect a cell corresponding to a frequency other than the MBSFN-dedicated frequency.

Meanwhile, according to the other embodiment, when the UE configures the cell corresponding to the MBSFN-dedicated frequency to be barred, the UE may reselect a cell among cells other than the barred cell based on the priority information.

The UE may initiate an RRC connection establishment procedure with respect to the reselected cell (S1140). To this end, the UE may receive system information (SI) from the reselected cell and may perform the RRC connection establishment procedure according to a general technology.

After performing cell reselection (the RRC connection establishment procedure), the UE may go back to the RRC idle state. If the UE is still interested in receiving an MBMS service, the UE may be provided with the MBMS service by readjusting priority information on the MBSFN-dedicated frequency. Specifically, when the UE enters the RRC idle state, the UE may readjust the priority information such that the MBSFN-dedicated frequency has a highest priority. Accordingly, when the UE enters the RRC idle state after performing the cell reselection procedure, the UE may be continuously provided with the MBMS service. Here, it should be noted that readjusting the priority information may be performed simply by the UE entering the RRC idle state but may be performed when an additional condition (for example, that the UE is configured to receive an MBMS service) is satisfied according to a user configuration.

Meanwhile, according to the other embodiment, when the UE configures the cell corresponding to the MBSFN-dedicated frequency to be barred, the UE may configure the barred cell not to be barred after entering the RRC idle state. Accordingly, the UE may be continuously provided with the MBMS service after going back to the RRC idle state.

Figure 12:
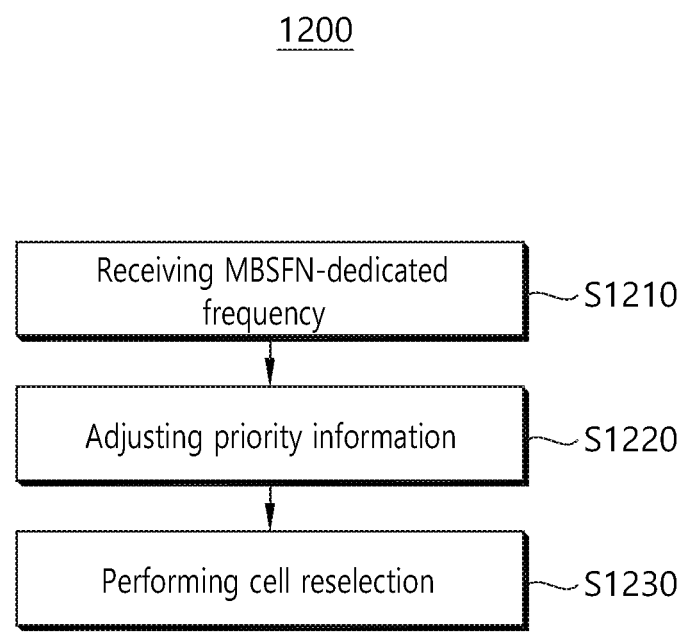
FIG. 12 is a flowchart illustrating a method for a UE to perform cell reselection procedure according to an embodiment of the present invention.

FIG. 12 is a flowchart 1200 illustrating a method for a UE to perform cell reselection procedure according to an embodiment of the present invention.

The UE may receive an information of MBSFN (multicast broadcast single frequency network)—dedicated frequency (S1210). The MBMS service may be provided to the UE through the MBSFN-dedicated frequency. The MBSFN-dedicated frequency refers to a frequency that enables only downlink transmission and does not enable uplink transmission. According to an embodiment of present invention, the UE may receive MBMS service, and the MBMS service is provided to the UE through the MBSFN-dedicated frequency.

Subsequently, the UE may adjust priority information on candidate frequencies such that the MBSFN-dedicated frequency has a lowest priority among the candidate frequencies (S1220). In this case, the MBSFN-dedicated frequency is not a highest-priority frequency any more. Further, the UE may adjust the priority information such that not only the MBSFN-dedicated frequency currently used to receive the MBMS service but also all MBSFN-dedicated frequencies currently not occupied have a lower priority. According to one embodiment, the UE may adjust the priority information such that not only the MBSFN-dedicated frequency currently used but also all MBSFN-dedicated frequencies have a lowest priority.

The UE may perform a cell reselection procedure based on the adjusted priority information on the candidate frequencies (S1230). Specifically, the UE may be configured to perform a cell reselection procedure with respect to a cell corresponding to a candidate frequency with a highest priority among the candidate frequencies. According to one embodiment, a reselected cell may be a cell supporting unicast transmission. To this end, the UE may reselect a cell corresponding to a frequency other than the MBSFN-dedicated frequency.

The UE may initiate an RRC connection establishment procedure with respect to the reselected cell. To this end, the UE may receive system information (SI) from the reselected cell and may perform the RRC connection establishment procedure according to a general technology.

Figure 13:
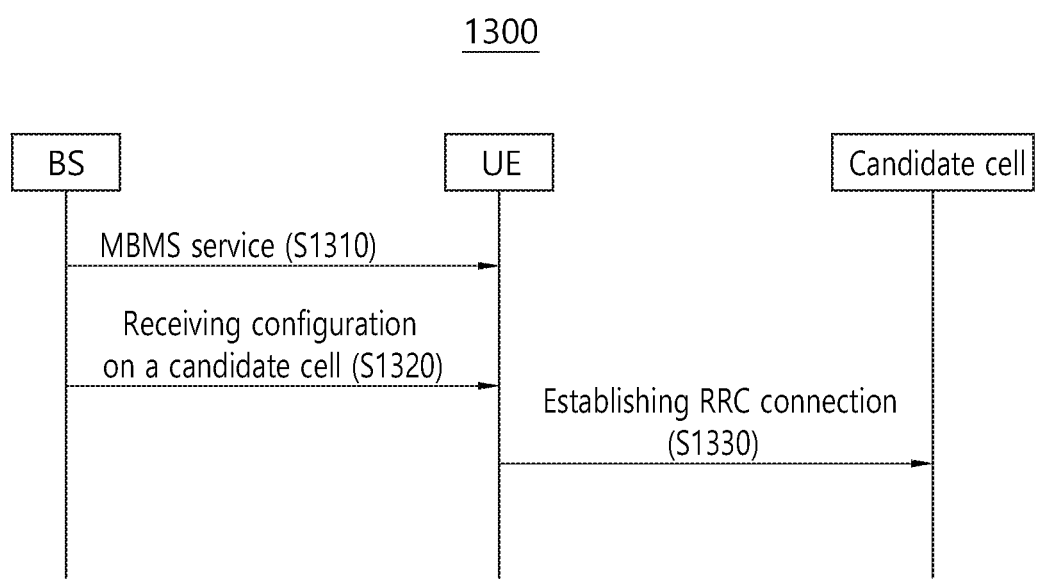
FIG. 13 is a flowchart illustrating a method for receiving MBMS service by a UE according to another embodiment of the present invention.

FIG. 13 is a flowchart 1300 illustrating a method for a operating MBMS service by a UE according to another embodiment of the present invention.

The UE according to the embodiment of the present invention may be provided with an MBMS service from an MBMS cell. The MBMS cell may be an MBSFN-dedicated cell, and the UE may be in the RRC idle state. The MBSFN-dedicated cell does not support unicast transmission and may allocate all used subframes only for MBSFN transmission. Accordingly, the UE may be provided with the MBMS service from the MBSFN-dedicated cell, camping on the MBSFN-dedicated cell (S1310).

The UE may receive configuration information on a candidate cell supporting unicast transmission from a network (S1320). The candidate cell is not an MBSFN-dedicated cell and may support unicast transmission, as mentioned above. The candidate cell may be a cell supporting a paging function for the UE.

The configuration information may include a list of one or more candidate cells and may be provided to the UE through system information. The configuration information may include the following items.
  ID of candidate cell
  Downlink (DL) frequency for candidate cell
  Uplink (UL) frequency for candidate cell
  System information on candidate cell According to one embodiment, the configuration information may include only essential system information required to access the candidate cell (for example, MIB, SIB1 and/or SIB2). When the UE is camping on the MBSFN-dedicated cell and the configuration information does not include the system information on the candidate cell to establish an RRC connection with, the UE may acquire necessary system information directly from the candidate cell.

The UE may perform a cell reselection procedure with respect to the candidate cell indicated by the configuration information. Here, the cell reselection procedure may be performed according to a general cell reselection procedure. Subsequently, the UE may perform an RRC connection to the reselected candidate cell.

According to the embodiment, the UE may establish the RRC connection to the candidate cell using the received configuration information (S1330). That is, when the UE is camping on the MBSFN-dedicated cell, the UE may establish an RRC connection to one of candidate cells using system information on the candidate cells included in the configuration information. In this case, the UE may immediately establish the RRC connection to the candidate cell without performing a cell reselection procedure.

When the UE is unable to establish the RRC connection using the received configuration information, that is, when the received configuration information does not include essential information (for example, MIB, SIB1 and/or SIB2) to establish the RRC connection, the UE may acquire the essential information directly from the candidate cell after performing the cell reselection procedure and may establish an RRC connection using the directly acquired system information.

Meanwhile, according to FeMBMS, an MBMS frequency is defined to additionally include 4th and/or 9th subframes among subframes (0th to 9th) of a radio frame, and accordingly a UE configured to support only existing MBMS may not support FeMBMS. That is, a UE not supporting FeMBMS may not normally receive an MBMS service if not excluding a frequency used only for FeMBMS when selecting an MBMS interest frequency, in which case the UE may not maintain the continuity of the MBMS service. Hereinafter, a method for a UE supporting only conventional MBMS to maintain the continuity of an MBMS service is described.

Figure 14:
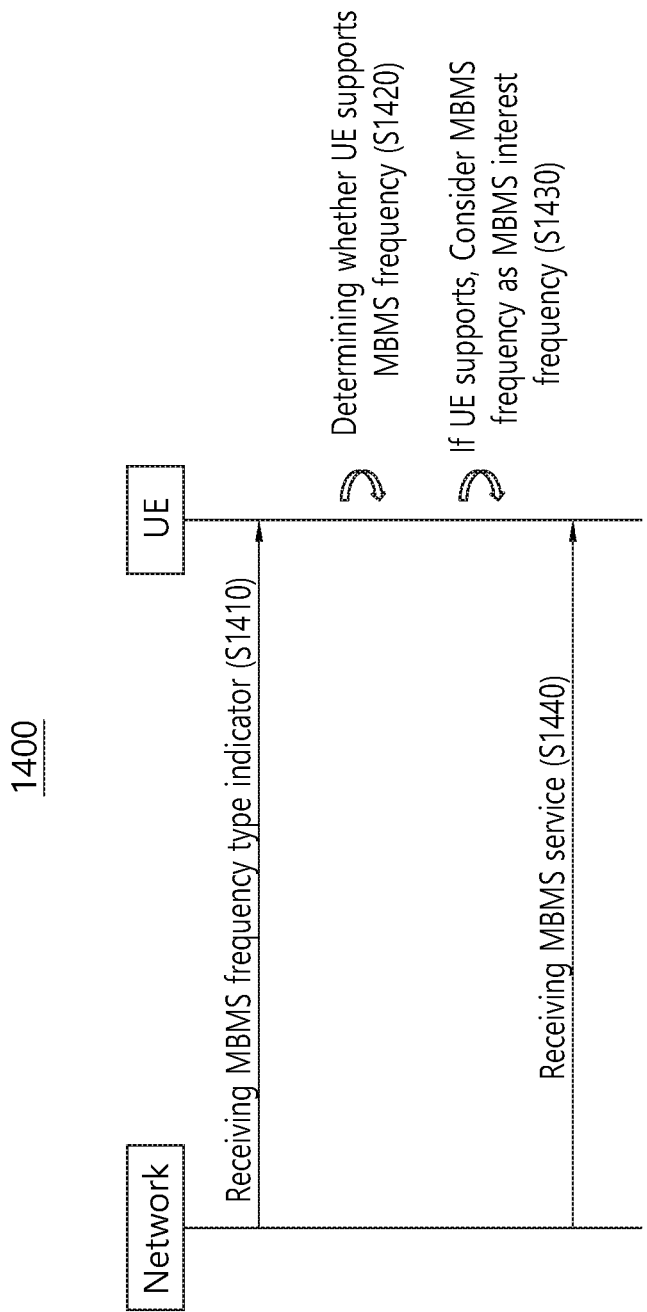
FIG. 14 is a flowchart illustrating a method of providing the continuity of an MBMS service according to an embodiment of the present invention.

FIG. 14 is a flowchart 1400 illustrating a method of providing the continuity of an MBMS service according to an embodiment of the present invention.

The UE may receive an MBMS frequency type indicator that indicates the type of an MBMS frequency related to an MBMS service to receive from a network (S1410). The MBMS frequency refers to a frequency available to provide the MBMS service. Further, according to the embodiment, the type of the MBMS service may refer to a combination of subframes included in a downlink radio frame. Here, the radio frame may be a radio frequency division duplexing (FDD) frame and may include ten subframes (0th to 9th). That is, the UE may acquire the type of a frequency for receiving an MBMS service of interest.

According to one embodiment of the present invention, the type of the MBMS frequency may be divided into a first type, a second type, and a third type. The first type may include a combination of one or more subframes among 1st, 2nd, 3rd, 6th, 7th, and 8th subframes. That is, the first type corresponds to the conventional MBMS frequency.

The second type may be configured to include a subframe other than the 1st, 2nd, 3rd, 6th, 7th and 8th subframes among the ten subframes. The second type may further use a subframe that is unavailable for the first type. The second type may use at least one of the 4th and 9th subframes as an MBMS frequency. Frequencies of the second type may be used for not only an MBMS service but also unicast transmission. Thus, the second type may indicate whether each subframe is used for MBSFN transmission or for unicast transmission. Specifically, the second type may include a flag indicating whether each subframe is used for MBSFN transmission or is used for unicast transmission.

The third type may be configured to include a subframe other than 1st, 2nd, 3rd, 6th, 7th and 8th subframes among the ten subframes, and all subframes forming the third type may be allocated for MBSFN transmission. Specifically, all frequencies included in the third type are configured to support an MBMS service and do not support unicast transmission. According to one embodiment, the third type may use not only the 1st, 2nd, 3rd, 6th, 7th and 8th subframes but also 4th and 9th subframes among the ten subframes, and these subframes may be configured to be used only for MBSFN transmission.

According to one embodiment, the MBMS service frequency type indicator may be provided from the network to the UE through MBMS service continuity information (SIB15). In SIB15, an MBMS service area identity (SAI) may be mapped to frequency information on a plurality of MBMS services. The frequency information on the MBMS services may include an MBMS frequency type indicator and a carrier frequency.

The UE may receive the MBMS service through an MBMS frequency indicated by the received MBMS frequency type indicator. Specifically, the UE may identify the type of the MBMS frequency for the MBMS service of interest through the received MBMS frequency type indicator and may receive the MBMS service through the MBMS frequency corresponding to the type.

According to one embodiment, when the MBMS frequency indicated by the received MBMS frequency type indicator is a frequency supported by the UE, the UE may receive the MBMS service through the MBMS frequency. Specifically, after receiving the MBMS frequency type indicator, the UE may determine whether the UE supports the type of the MBMS frequency indicated by the received MBMS frequency type indicator (supportedMBMSfrequencyType) (S1420). That is, the UE may determine whether the UE supports the type of the MBMS frequency based on capability thereof.

For example, when the received MBMS frequency type indicator indicates the first type, the UE may determine whether the UE supports an MBMS frequency corresponding to the first type. According to one embodiment, the UE may support the MBMS frequency corresponding to the first type. When the UE supports the MBMS frequency corresponding to the first type, the UE may consider the MBMS frequency corresponding to the first type as a part of an MBMS interest frequency and may receive the MBMS service through the MBMS frequency.

When the received MBMS frequency type indicator indicates the second type, the UE may determine whether the UE supports an MBMS frequency corresponding to the second type. According to one embodiment, the UE may not support the MBMS frequency corresponding to the second type. When the UE does not support the MBMS frequency corresponding to the second type, the UE may not consider the MBMS frequency corresponding to the second type as an MBMS interest frequency. That is, the UE may determine that the UE is unable to receive the MBMS service through the MBMS frequency corresponding to the second type and may exclude the frequency corresponding to the second type from the MBMS interest frequency.

Further, when the received MBMS frequency type indicator indicates the third type, the UE may determine whether the UE supports a frequency corresponding to the third type. According to one embodiment, the UE may not support the MBMS frequency corresponding to the third type.

Meanwhile, although the UE may explicitly acquire the type of the MBMS frequency for the MBMS service of interest by receiving the MBMS frequency type indicator from the network, the present invention is not limited thereto. Alternatively, the UE may implicitly acquire the type of the MBMS frequency by receiving a configuration of an MBSFN subframe for the MBMS service of interest. An MBSFN subframe is a subframe for transmitting a physical multicast channel (PMCH), in which no common reference signal (or cell-specific reference signal: CRS) may be transmitted in an area other than a PDCCH area formed by first two OFDM symbols. Here, a CRS refers to a reference signal recognized by all UEs in a cell. A CRS is mentioned in Section 6.10 of 3GPP TS 36.211. V9.1.0. The UE may acquire the configuration of the MBSFN subframe through SIB2. For example, the UE may determine that: the MBMS frequency is the first type when the 0th, 4th, 5th and 9th subframes are not configured; the MBMS frequency is the second type when the 0th, 4th, 5th and 9th subframes are configured; and the MBMS frequency is the third type when all of the ten subframes are configured or SIB2 is not provided.

When the UE determines that the UE supports the MBMS frequency corresponding to the received MBMS frequency type indicator, the UE may consider the frequency as the MBMS interest frequency (S1430).

When there is an MBMS frequency considered as the MBMS interest frequency, the UE may receive the MBMS service through the MBMS frequency (S1440). When there is no MBMS frequency considered as the interest frequency, the UE may receive another MBMS frequency type indicator for the MBMS service of interest and may repeat the foregoing procedure.

Although the embodiments of the present invention show that an MBMS frequency type is acquired to receive an MBMS service, the present invention is not limited thereto. It should be noted that a configuration of transmitting and using an MBMS frequency type is also applied in setting a priority for MBMS frequency reselection.

Hereinafter, a method for a UE not supporting an FeMBMS carrier to receive an MBMS service is described.

The UE may receive SIB15 before receiving an MBMS service. SIB15 may include information on an MBMS frequency. For example, the MBMS frequency may be an MBSFN carrier or a non-MBSFN carrier.

The UE may determine through SIB15 which MBMS frequency is related to an MBMS service to receive. Specifically, the UE may determine whether an MBMS frequency providing an MBMS service of interest is a frequency supported by the UE. According to one embodiment, the UE may determine whether an MBMS frequency of interest is a frequency supported by the UE.

If the MBMS frequency is an FeMBMS carrier, the UE may not consider the MBMS frequency to have a highest priority. The UE may consider the MBMS frequency to have a lowest priority. If the MBMS frequency is a non-FeMBMS carrier, the UE may consider the MBMS frequency to have a highest priority. Accordingly, the UE not supporting an FeMBMS carrier may be prevented from camping on an FeMBMS cell. Further, since an FeMBMS carrier does not support a paging function, a UE not camping on an FeMBMS cell may use a paging function.

Meanwhile, in Release 14, MBMS cells may be classified into an MBMS-dedicated cell, an MBMS/unicast-mixed cell, and an FeMBMS/unicast-mixed cell. According to one embodiment of the present invention, an MBMS cell corresponding to the first type described in FIG. 13 may be a conventional MBMS/unicast-mixed cell. Further, an MBMS cell corresponding to the second type may be an FeMBMS/unicast-mixed cell in Release 14. Further, an MBMS cell corresponding to the third type may be an MBMS-dedicated cell supporting FeMBMS.

Hereinafter, a method of adjusting a priority in a cell reselection procedure to provide the continuity of an MBMS service is described.

A UE may not be allowed to camp on an FeMBMS cell. Likewise, a UE supporting FeMBMS may not be allowed to camp on an FeMBMS cell. Since an FeMBMS carrier does not support a paging function, even the UE supporting FeMBMS may not be provided with a paging function when camping on an FeMBMS cell.

Specifically, the UE may receive SIB1 from a cell and may determine whether the cell is an FeMBMS cell. The UE may determine through SIB1 whether a frequency used by the cell is an FeMBMS carrier. When the cell is an FeMBMS cell, the UE may bar the cell or the FeMBMS carrier.

Further, a network may notify the UE through SIB15 whether an MBMS frequency is an FeMBMS carrier. Specifically, SIB15 may include an indicator indicating whether an MBMS frequency corresponds to an FeMBMS carrier. When the UE receives SIB15 via an FeMBMS carrier, the UE does not need to read SIB1 corresponding to SIB15. When the UE receives SIB15 through a non-FeMBMS carrier, the UE may know which frequency is an FeMBMS carrier among neighboring frequencies. Accordingly, the UE may not camp on the FeMBMS frequency. When the indicator indicating that the MBMS frequency corresponds to the FeMBMS carrier is included in SIB15, it is broadcast to the UE that the FeMBMS cell is barred.

Further, although an MBMS service of interest is provided through the FeMBMS frequency, the UE may not assign a highest priority to the FeMBMS frequency. The UE may assign a highest priority to an MBMS frequency providing the MBMS service of interest in order to guarantee the continuity of the MBMS service. However, when camping on the FeMBMS cell is not supported, although the MBMS service of interest is provided through the FeMBMS frequency, the UE may not assign a highest priority to the FeMBMS frequency.

Fourth, the UE may not set the FeMBMS as a PCell, which may be the same when the UE supports FeMBMS.

Figure 15:
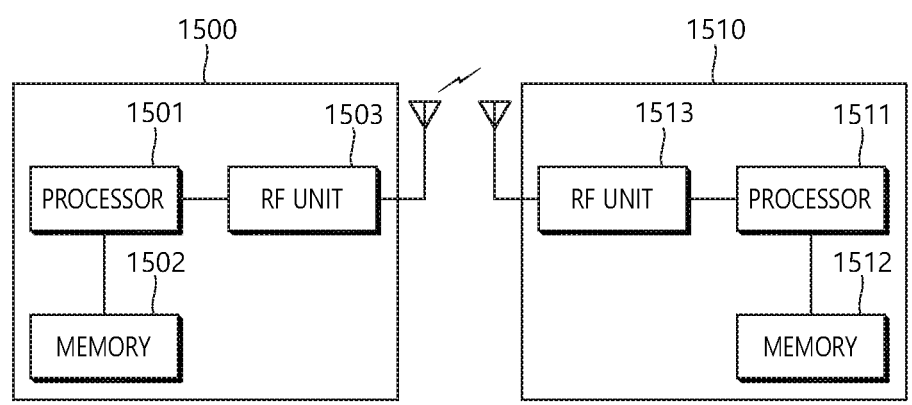
FIG. 15 shows a wireless communication system to implement an embodiment of the present invention.

FIG. 15 is a block diagram illustrating a wireless apparatus in which an embodiment of the present invention can be implemented.

A BS 1500 includes a processor 1501, a memory 1502, and a radio frequency (RF) unit 1503. The memory 1502 is coupled to the processor 1501, and stores a variety of information for driving the processor 1501. The RF unit 1503 is coupled to the processor 1501, and transmits and/or receives a radio signal. The processor 1501 implements the proposed functions, procedures, and/or methods. In the aforementioned embodiments, an operation of the BS may be implemented by the processor 1501.

A UE 1510 includes a processor 1511, a memory 1512, and an RF unit 1513. The memory 1512 is coupled to the processor 1511, and stores a variety of information for driving the processor 1511. The RF unit 1513 is coupled to the processor 1511, and transmits and/or receives a radio signal. The processor 61 implements the proposed functions, procedures, and/or methods. In the aforementioned embodiments, an operation of the UE 1510 may be implemented by the processor 1511.

The processors 1511 may include application-specific integrated circuit (ASIC), other chipset, logic circuit and/or data processing device. The memories may include read-only memory (ROM), random access memory (RAM), flash memory, memory card, storage medium and/or other storage device. The RF units may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method performed by a user equipment (UE) in a wireless communication system, the method comprising:
    receiving an information of a further enhanced multimedia broadcast multicast services (FeMBMS) carrier;
    adjusting priority of candidate frequencies such that the FeMBMS carrier has a lowest priority among the candidate frequencies for cell reselection; and
    performing the cell reselection based on the adjusted priority,
    wherein the FeMBMS carrier is allowed to use at least one subframe other than 1st, 2nd, 3rd, 6th, 7th and $8^{th}$ subframes of a radio subframe.

2. The method of claim 1, further comprising receiving a paging message from an upper layer before the adjusting of the priority of the candidate frequencies.

3. The method of claim 1, wherein the adjusting of the priority of the candidate frequencies adjusts a frequency comprising a band allocated for downlink and uplink transmissions among the candidate frequencies to have a highest priority.

4. The method of claim 1, further comprising establishing an RRC connection to a reselected cell after the performing of the cell reselection.

5. The method of claim 1, further comprising readjusting the priority of the candidate frequencies such that the FeMBMS carrier has a highest priority when the UE enters an RRC idle state, after the performing of the cell reselection.

6. A user equipment (UE) performing cell reselection in a wireless communication system, the UE comprising:
   a memory;
   a transceiver; and
   a processor configured to connect the memory and the transceiver,
   wherein the processor is configured to: receive an information of a further enhanced multimedia broadcast multicast services (FeMBMS) carrier; adjust priority of candidate frequencies such that the FeMBMS carrier has a lowest priority for cell reselection; and perform the cell reselection based on the adjusted priority,
   wherein the FeMBMS carrier is allowed to use at least one subframe other than 1st, 2nd, 3rd, 6th, 7th and $8^{th}$ subframes of a radio subframe.

7. The UE of claim 6, wherein the processor is configured to receive a paging message from an upper layer before adjusting the priority of the candidate frequencies.

8. The UE of claim 6, wherein the processor is configured to adjust the priority of the candidate frequencies by adjusting a frequency comprising a band allocated for downlink and uplink transmissions among the candidate frequencies to have a highest priority.

9. The UE of claim 6, wherein the processor is configured to establish an RRC connection to a reselected cell after performing the cell reselection.

* * * * *